US006727971B2

(12) United States Patent
Lucas

(10) Patent No.: US 6,727,971 B2
(45) Date of Patent: Apr. 27, 2004

(54) APPARATUS AND METHOD FOR CURVED SCREEN PROJECTION

(75) Inventor: Walter A. Lucas, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 09/941,885

(22) Filed: Aug. 28, 2001

(65) Prior Publication Data

US 2002/0131018 A1 Sep. 19, 2002

Related U.S. Application Data

(60) Provisional application No. 60/260,638, filed on Jan. 5, 2001.

(51) Int. Cl.$^7$ .......................... G03B 37/00; G03B 21/32
(52) U.S. Cl. .............................. 352/85; 352/69; 352/86
(58) Field of Search .................... 52/7, 8, 9; 352/69, 352/85, 86; 359/725; 472/60

(56) References Cited

U.S. PATENT DOCUMENTS

| 3,469,837 A | 9/1969 | Heilig .......................... 472/60 |
| 3,998,532 A | 12/1976 | Dykes .......................... 352/69 |
| 4,464,029 A | 8/1984 | Jaulmes ........................ 352/69 |
| 4,639,224 A | 1/1987 | Maejima et al. ............. 434/286 |
| 4,744,652 A | 5/1988 | Lindsey ...................... 353/101 |
| 5,023,725 A | 6/1991 | McCutchen .................. 348/38 |
| 5,264,881 A | 11/1993 | Brooke .......................... 353/94 |
| 5,376,980 A | 12/1994 | Gersuk et al. ................. 353/94 |
| 5,433,670 A | 7/1995 | Trumbull ...................... 472/60 |
| 5,611,174 A | 3/1997 | Hayashi ........................... 52/8 |
| 5,745,305 A | 4/1998 | Nalwa .......................... 359/725 |
| 5,762,413 A | 6/1998 | Colucci et al. ............. 353/122 |
| 5,765,314 A | 6/1998 | Giglio et al. .................... 52/7 |
| 5,825,540 A | 10/1998 | Gold et al. .................. 359/462 |
| 5,845,434 A | 12/1998 | Hayashi ........................... 52/9 |
| 6,017,276 A * | 1/2000 | Elson et al. .................. 434/29 |

OTHER PUBLICATIONS

International Search Report dated Apr. 23, 2002.

* cited by examiner

Primary Examiner—Rodney Fuller
(74) Attorney, Agent, or Firm—Greenberg Traurig; Christopher Darrow

(57) ABSTRACT

Apparatus and methods for recording and projecting images on curved screens in a manner that imparts to an audience a sense of immersion in the projected scene. The screen is usually a segment of a spherical dome, with a large portion of the segment located below the horizontal viewing line of an audience. During recording of the images, the camera lens longitudinal axis is maintained in a substantially horizontal orientation. During projection, the projector lens longitudinal axis is maintained in a substantially horizontal orientation, and the image is positioned on the screen by horizontal and/or vertical movement of the projector lens relative to the film. The image is projected to appear to the viewer to be in substantially the same position as it was to the camera lens during recording.

29 Claims, 10 Drawing Sheets

FIG. 14
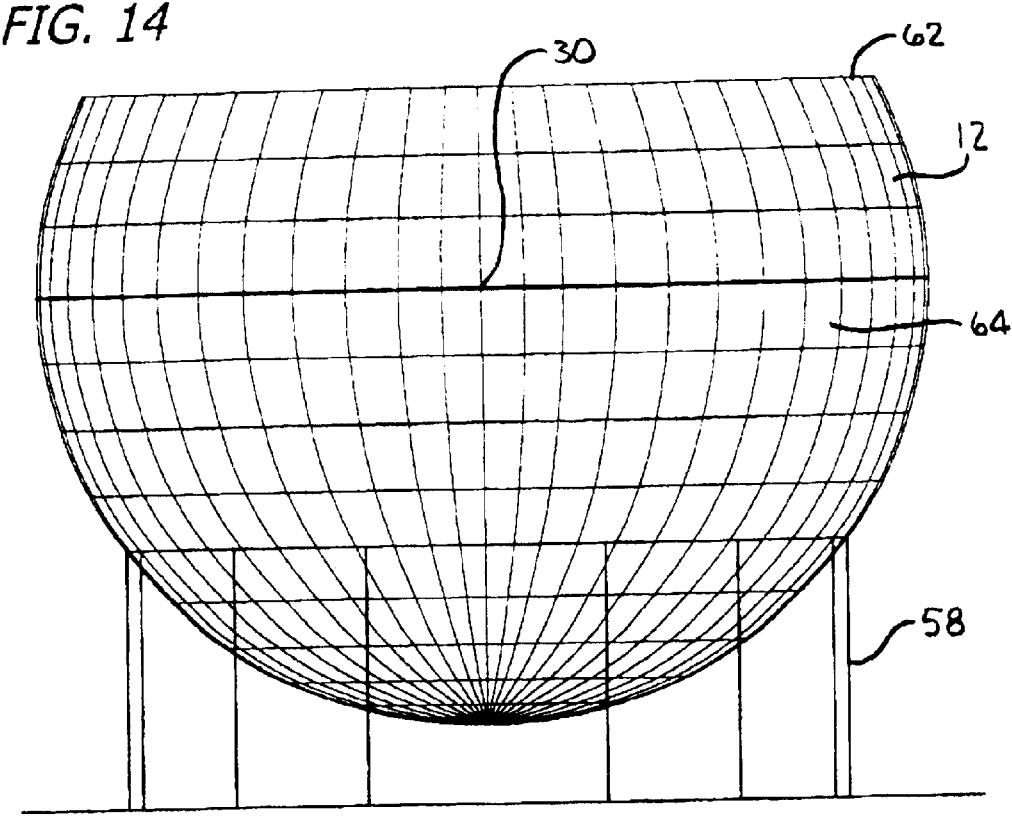
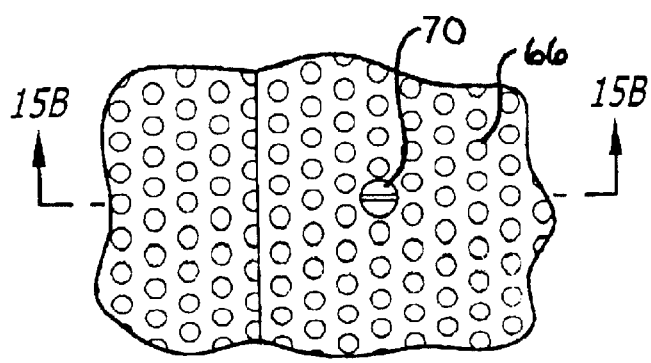
FIG. 15A
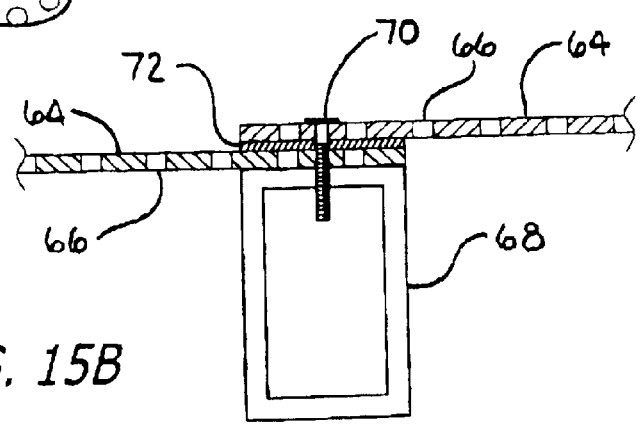
FIG. 15B

PRIOR-ART

APPARATUS AND METHOD FOR CURVED SCREEN PROJECTION

CROSS-REFERENCE TO RELATED APPLICATION

This application claims the benefit of U.S. Provisional Application No. 60/260,638 filed Jan. 5, 2001, whose entire contents are hereby incorporated by reference.

BACKGROUND OF THE INVENTION

This invention generally relates to apparatus and methods for recording and projecting images on curved screens in a manner that imparts to an audience a sense of immersion in the projected scene. The screen is usually a segment of a spherical dome, with a large portion of the segment located below the horizontal viewing line of an audience. For a relatively large audience, the viewing lines are optimized for the center, or "sweet spot," of the audience. When the invention is used in a setting such as a theme park attraction, the audience may be suspended relative to the segment to give the guests the feeling of flying over the projected scene. The scenes may be landscapes such as mountain valleys, orange groves or pine forests. The scenes may be the buildings of a city, or surfers riding ocean waves. The invention imparts to the audience the feeling of immersion in the projected scene.

Curved projection screens, such as domes found in IMAX systems, have generally been placed in front of and overhead an audience, with much of the projected scene above the horizontal sight lines of the audience. Because the goal of the present invention is to create a feeling of being within and over a scene, the technology that presently exists for projecting a scene to an upward looking audience is not satisfactory.

The images that are projected may be filmed, video taped, recorded digitally or recorded in any other manner, or may be created artificially using animation, computer generated graphics or any other method. If recorded on film, as by a helicopter carrying a camera system, then the system of the present invention gives the audience the perception that they are located relative to the projected scene in approximately the same position as the camera lens was positioned relative to the scene it was recording.

In order to appear realistic, the images that are recorded on film by a camera must appear, when projected on the screen to the theater viewer, to be in the same relative positions and at the same relative angles as they appeared to the camera lens while being filmed (scene angles). The field of view of the projected image must substantially match the field of view of the image as observed by the camera lens. For example, when flying over a square building, as an observer passes directly over it, he or she would see just the top of the building as a square underneath the observer's feet. In filming the same scene, it is important to choose the lens and camera position to record the same images as would be seen by a human observer. For example, if the building were filmed at an angle relative to an observer, it would appear to look unrealistic on the film; a viewer of the captured image would see the sides of the building underneath his feet. The building would appear to be tilted. It would not appear to be in its correct position. The observer would get the feeling that he or she was looking at a movie projected on a screen rather than having an immersive experience. The goal for both the filming of the scene and its projection is to substantially duplicate to the eyes of a theater viewer what a human observer would have seen as he or she was physically flying over the scene. Therefore, the image shot must capture the fields of view and angles of view of a human observer flying over the scene, and the image projected on the screen must also replicate these fields of view and angles of view of the images. In other words, the objects in the physical scene that are recorded on camera must be projected onto the screen to appear to be in the same positions as the actual objects were relative to the observer (camera lens) and relative to the other objects in the scene, in order that they look correct to a viewer. The relative sizes should be approximately the same, and the relative angles of view of the projected images as seen by a theater viewer (viewing angles) should approximately match the relative angles of view of the physical objects seen by the camera lens (scene angles).

An example will now be described. Imagine a horizon at a distance, like the ridge of a hill, and a group of riders on top of the horizon on horseback. To the camera lens, the horizon appears at eye level. To appear real when projected, the horses and riders should be at the same horizon level, namely at the viewer's eye level. If they were lower down on the screen, it would appear to a viewer that the horses were on their sides. Unless the effect is substantially fully accomplished, the observer will not feel that he is in the scene, as a part of it. In contrast, in a normal movie theater, an observer is looking at an essentially flat screen. If in the scene a character is standing on the top of a building, and a camera replaces the character that then looks down, the camera shoots down and the observer will see the traffic below. He will understand that the character is looking down, but the observer will not perceive the realistic feeling that the observer himself is on top of a building looking down. The latter effect is one of the objects of the invention.

In order to achieve the feeling of being in the scene and actually on top of the building, there are limited options. One way of accomplishing this is through CGI, computer generated images, which is a mathematically intensive and expensive process. The images can be generated entirely by the computer, or images captured on film may be manipulated to correct angles of view and sizes. One goal of the invention is to accomplish this result without the need for a significant amount of costly computer image correction. An example of a problem to be solved can be described as follows. If an observer saw a straight line in the distance, such as a road, railway track or the Golden Gate Bridge, when it appeared on the curved screen it must appear straight or flat as well. It could not appear to be curved, which is the normal result when projecting down onto a curved screen.

One aspect of the solution is to keep the projector horizontal to project straight onto the curved screen, but offset the lens downwards. This moves the image down without introducing a tilt. Moving the image down while maintaining a straight horizon is essential to compensate for the fact that the projector is above the audience. If the projector were actually in the audience's sweet spot, then this displacement of the projector lens would not be required. However, it is impractical to place a large IMAX type projector into the center of an audience, because it would be intrusive and detract from the experience of the audience. If the projector were set at an angle by tilting the projector downward to fill the screen surface, a viewer in the audience would see a curved horizon line reflecting the angle of tilt. In other words, a horizon line would be curved as in a smiley face icon, or it could be a frowning face, depending on the relative positions of the projector, audience and screen, and whether the line is above or below the horizontal centerline of the audience. By keeping the projector lens substantially horizontal, the horizon line will project as a straight line on the curved surface. The image is lowered down by offsetting the lens downward to bring the horizon line, or any other desired line, down to a position that matches the position of that line as it was observed by a camera lens and recorded on film. In this way, the viewer suspended above a dome, or other curved surface, in a theater will see the same image as observed by a camera lens, from the same viewpoint as the camera lens, without the need to resort to computer generated imaging correction.

The curved screen is made of perforated panels, preferably aluminum, which are assembled into a generally hemispherical shape. Individual panels overlap approximately one inch, with a strip of black tape placed between the panels to ensure uniform reflectivity. Special consideration is given to the construction of the screen and the manner in which the individual panels are overlapped. If the edge of a panel can be seen by a viewer, this can, in some scenes, be observed as a black line on the screen, detracting from the overall realism of the projection. Therefore, panels are placed in such a way that panel edges are facing away from the viewer. Additionally, during the process of shearing, especially with aluminum sheets, the shearing results in a panel with a natural chamfer. If this chamfer is positioned on the outer edge of the seam, the edge thickness is reduced, further reducing the problem of a visible edge.

Aerial scenes, which are projected on the curved screen, are preferably filmed with an IMAX 15-perforation 48 fps 70 mm camera, using a Zeiss 30 mm fisheye lens. In the preferred embodiment, the camera and associated equipment are positioned underneath a helicopter in a cradle. To achieve for the viewer an impression of immersion in the projected scene, as the helicopter is flown relative to the ground, the camera and lens is pointed straight ahead. This gives the feeling of flying over the ground, whereas tilting the camera gives the impression of flying into the subject. The angular and relative positions of the filmed objects are essentially duplicated, as seen by a viewer, by the projection system. INVENTION SUMMARY The present invention is directed to the field of recording images and projecting the recorded images onto a surface located generally below a viewer. The surface is generally curved, and may be the interior of a segment of a dome. During recording of the images, the camera lens longitudinal axis is maintained in a substantially horizontal orientation. During projection, the projector lens longitudinal axis is maintained in a substantially horizontal orientation, and the image is positioned on the surface by horizontal and/or vertical movement of the projector lens relative to the film. The image is projected to appear to the viewer to be in substantially the same position as it was to the camera lens during recording.

BRIEF DESCRIPTION OF THE DRAWINGS

FIG. 14 is a rear elevation view of a dome shaped projection surface.

FIG. 15A is a plan view depicting the overlapping of projection surface panels.

FIG. 15B is a cross section taken along line 15B from FIG. 15A.

DESCRIPTION OF THE PREFERRED EMBODIMENTS

Figure 1:
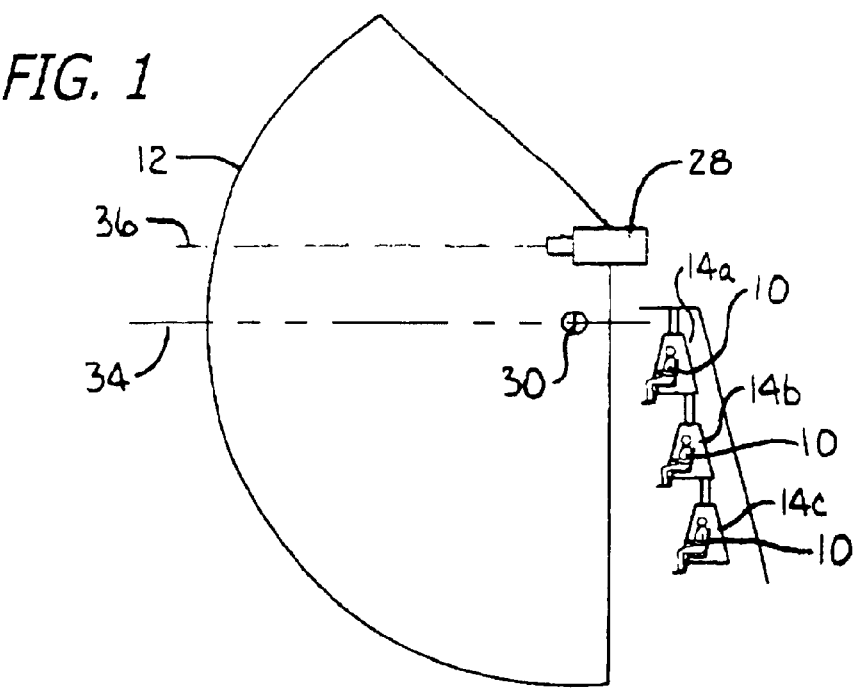
FIG. 1 is an elevation side view of depicting the relative positions of the projection surface, projector and viewers.
Figure 2:
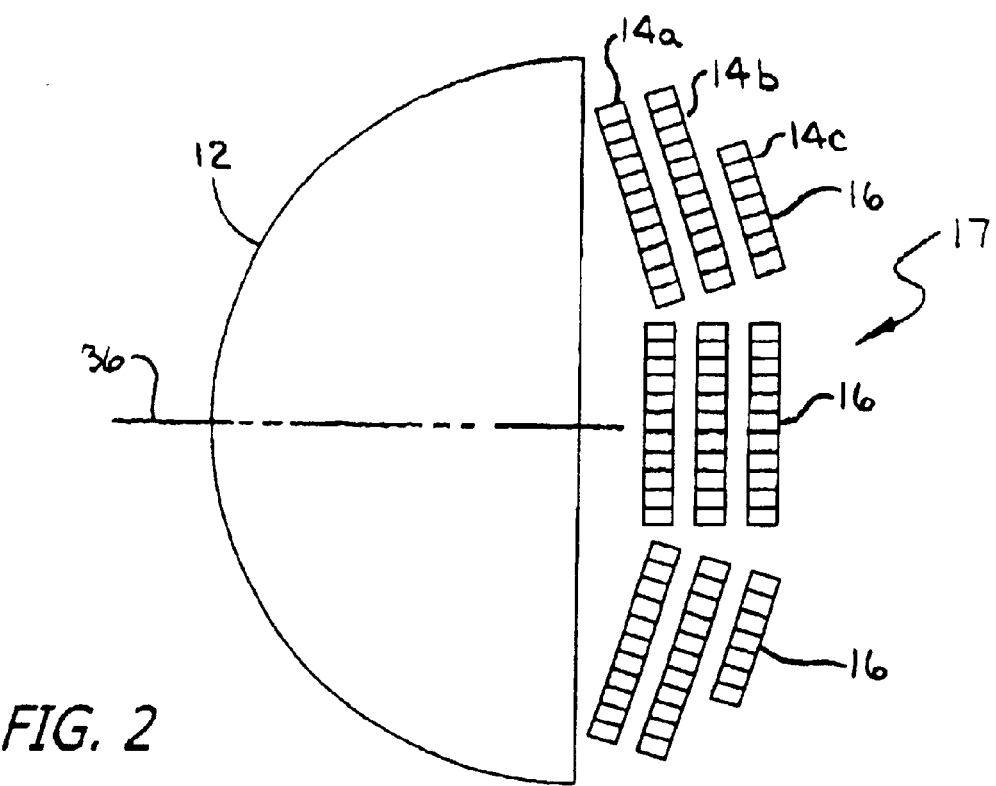
FIG. 2 is a plan view a the main elements in FIG. 1.

In one embodiment of the present invention, the projection screen is a segment of a dome, a large portion of which is located generally below the horizontal viewing line of an audience. In FIG. 1, the major components of the system, which includes the invention, are shown. One or more viewers 10 are positioned relative to a curved projection screen 12. In the depicted preferred embodiment, the viewers are seated and are suspended relative to the screen 12. The viewers 10 may be arranged in a variety of patterns, one example of which is depicted in FIG. 2, which shows several rows 14 (a, b, c) of viewers in three groups 16. The groups 16 form an audience viewing station shown generally as 17. Each small box in the groups 16 represents one viewer 10. The rows and groups may be arranged in different configurations, and the numbers of rows and groups may be changed. For a relatively large audience, the viewing lines are optimized for the center, or "sweet spot" of the audience. This is common practice in the motion picture industry, as relative sizes of the audience and the projection screen are chosen to maximize the size of the audience while providing each viewer with an acceptable viewing experience. In the preferred embodiment of the invention, the audience is suspended relative to the screen 12, so that much of the projected scene is below the horizontal viewing line of an audience.

Figure 3:
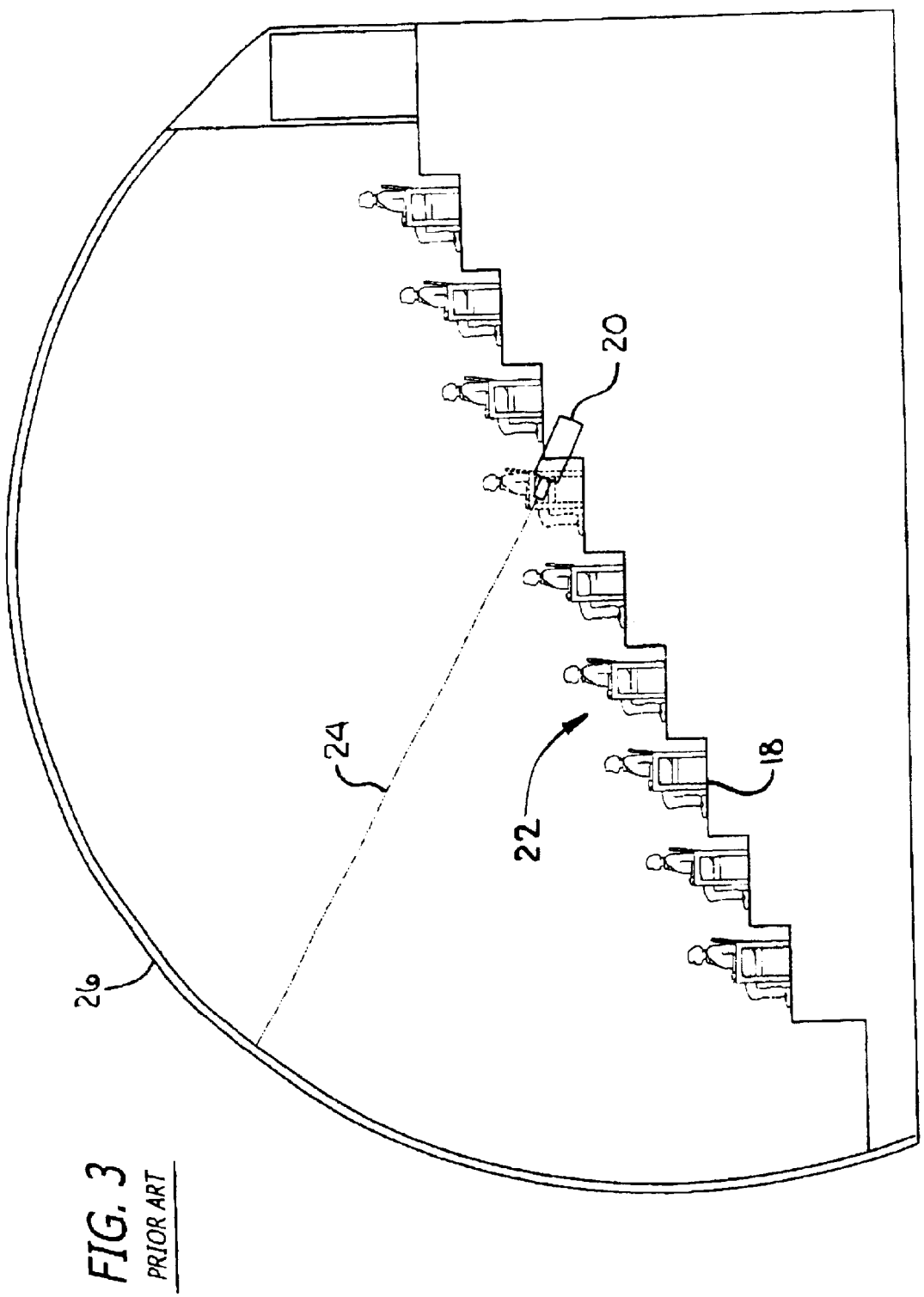
FIG. 3 is an elevation view of a prior art IMAX theater.

The configuration of the audience seating is chosen so that there will be minimum interference of sight lines of the viewers 10. In a popular prior art theatre known as an IMAX® Theater, FIG. 3, the audience seating floor 18 slopes downward from the back of the theater to the front. An IMAX projector 20 is located near the audience seating 22, and projects along a projection axis 24 onto IMAX projection screen 26, which is positioned generally overhead of the audience 22. In contrast, in a theater of the present invention, the slope of the audience is uniquely arranged. The topmost row 14a is positioned ahead of the row immediately below. Middle row 14*b* is positioned ahead of lowest row 14*c*. In alternative embodiments, additional rows may be added, with each successive row further below and to the rear of the row immediately above. This positioning reduces the visual interference between viewers 10 while they are viewing screen 12.

Figure 4:
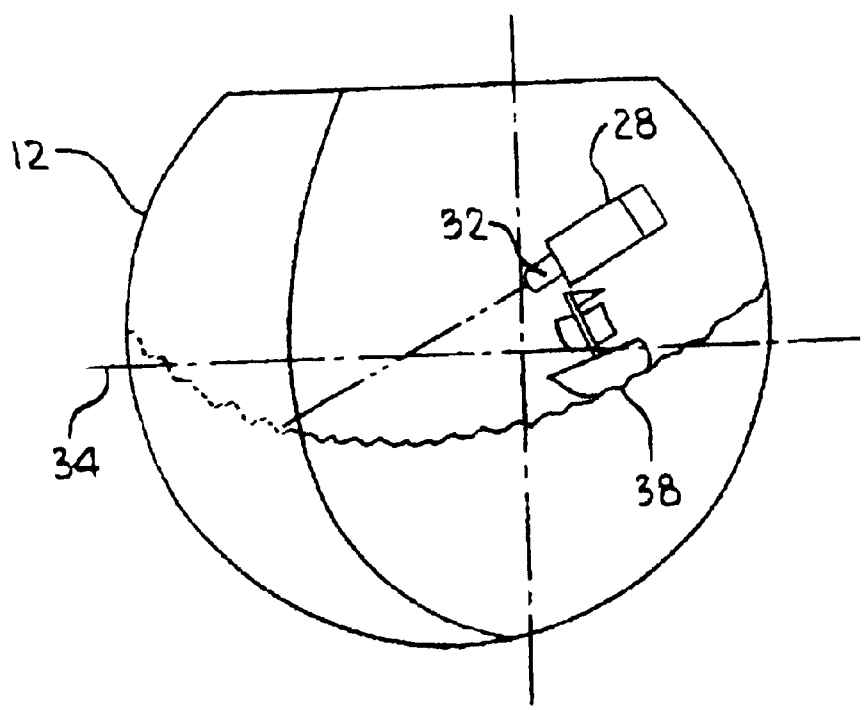
FIG. 4 is a perspective view depiction of a horizon line projected by a tilted projector.
Figure 5:
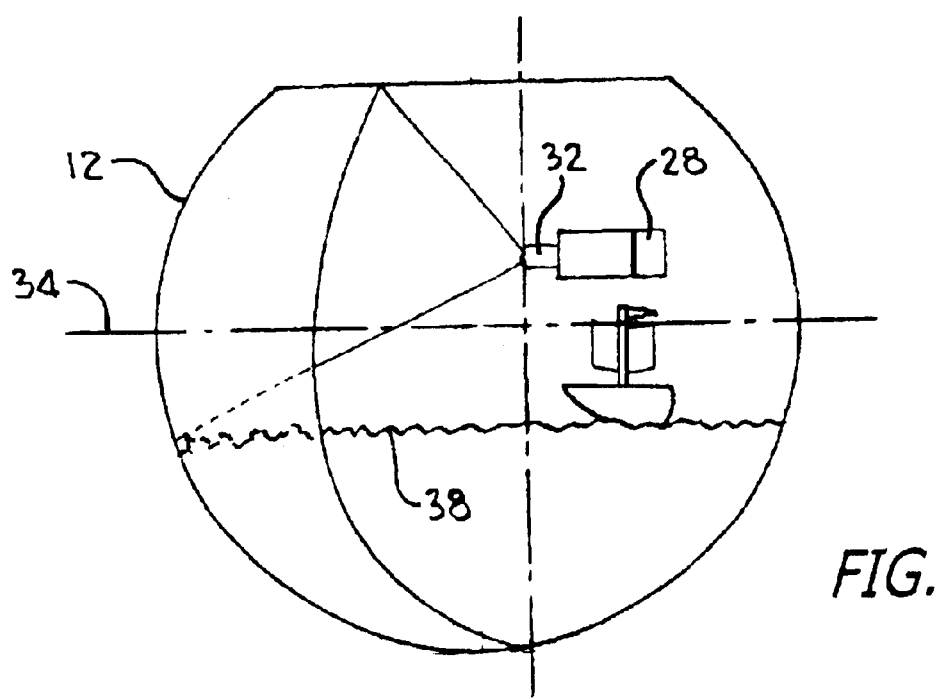
FIG. 5 is a perspective view depiction of a horizon line projected by a horizontal projector with an offset lens.

In the preferred embodiment, a projector 28 is positioned generally above the viewers 10. The projector has a lens system 32, which will be discussed below. The angle of the projector lens relative to screen and the position of the audience must be considered in determining the position of the projector. The optimum optical position for the projector lens is at the center 30 of the spherically curved projection screen 12. However, this may not be preferred because of possible interference with the audience seating layout chosen for the venue. In the preferred embodiment, the projector and its lens system 32 is moved approximately 9 feet above center 30 to allow for three rows of viewers 10 underneath. With the projector 28 and the lens 32 above the screen center 30, the image will correspondingly be raised above the centerline 34. In FIG. 1, this is depicted as projection reference 36, also referred to as the centerline of projection. Therefore, in order for a viewer 10 to feel as though he or she is in the same position as the recording lens 84 of the camera 80 relative to the captured scene 90, the image must then be moved lower to compensate for the raising of the projector. This could be accomplished by tilting the projector downwardly to project the image downwardly to fill the screen 12 with the picture. However, tilting causes an unrealistic image to be displayed, as shown in FIG. 4. Tilting of projector 28 will cause the horizon 38, as well as other horizontal lines and edges, to appear curved. Lines that are not horizontal will also be affected to varying degrees; for example, lines that should be seen as parallel may appear to diverge, and the resulting images will not appear life like. Thus, in the preferred embodiment, depicted in FIG. 5, the projector 28 is maintained at an essentially horizontal orientation along both its longitudinal and transverse axes, and the horizon 38 appears properly horizontal, and other lines and edges maintain their proper angular orientations. In order to lower the projected images on the carved projection screen 12, the lens 32 of the projector 28 is lowered relative to the horizontal centerline of the film which is moving through the projector. The lens is maintained in a vertical plane and is not tilted. As discussed above, tilting the lens would distort the image. Offsetting the lens down, below the centerline of projection 36, brings the image down, but the relative angles of the light rays exiting the lens are not effected. Therefore, a horizontal ray will remain horizontal when the lens is offset down, or in any other direction. This method eliminates unwelcome effects caused by tilting. Offsetting the lens 32 in another direction relative to the centerline of projection 36 will offset the projected image in that direction. Of course, instead of film a pixel plane, or other system compatible with computer generated images, may be used to generate images to be projected. In such a case, the lens 32 would be lowered relative to the centerline of the pixel plane or other image generating system.

Figure 6:
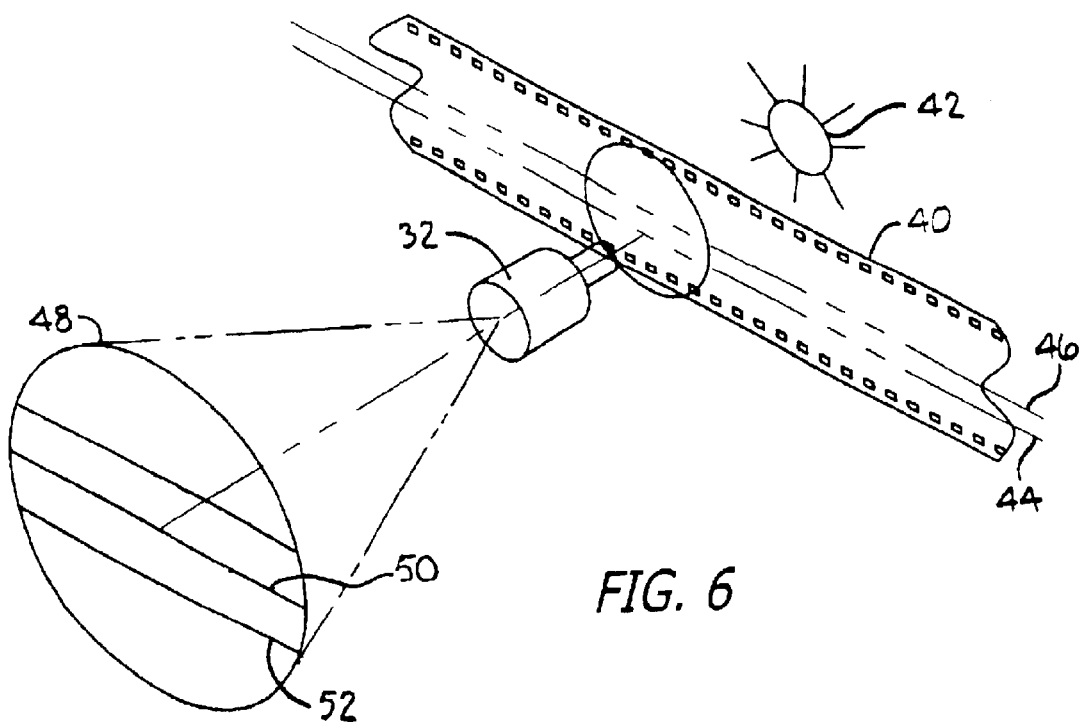
FIG. 6 is a perspective view depicting the effect of offsetting a projector lens relative to the film.
Figure 7:
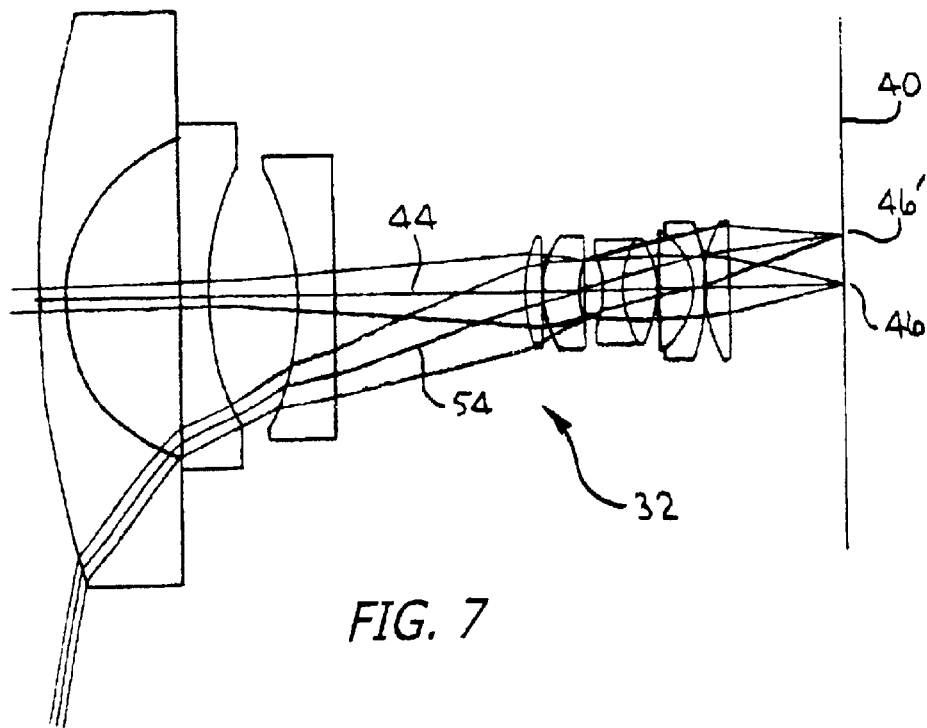
FIG. 7 is a side view of a lens system and refracted light rays.
Figure 6A:
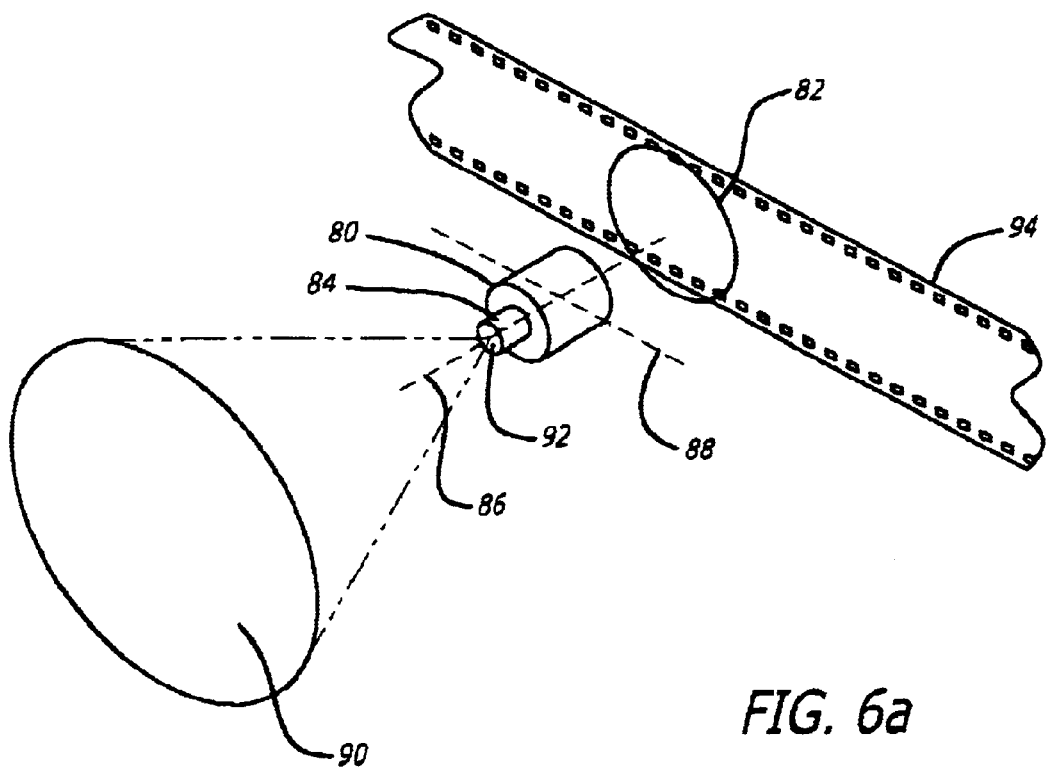
FIG. 6a is a perspective view depicting a recording camera system.

FIG. 6 depicts the effect of offsetting a projector lens or lens system 32 relative to a film strip 40 moving through a projector (not shown). In this depiction, a light source 42 is positioned near the film 40 on the opposite side of the film 40 from the lens 32. As the axial centerline 44 of the lens 32 is offset relative to the centerline 46 of film 40, the projected picture 48 is offset in the same direction as the lens 32 is offset. As depicted in FIG. 6, the picture 48 is offset from its non-offset position 50 to an offset position 52. The amount of picture offset is proportional to the amount of lens offset, and may be calculated using known lens functions. For example, for a standard Zeiss 30 mm 160° FOV F2 lens system shown in FIG. 7, and for the relative dimensions of the preferred embodiment of this invention, movement of the lens system 32 relative to the film 40 by 0.38 inches will result in a picture offset of approximately 9 feet on the screen 12. In FIG. 7, when the centerline of the lens system 32 coincides with the film centerline 46, light rays from the film centerline pass through the lens centerline 44. When the lens centerline 44 is offset relative to the film, depicted as downwardly or towards the bottom of FIG. 7, film centerline 46 appears at relative position 46', and light rays emanating from the film centerline are refracted downwardly along path 54 by the lens system's optical characteristics. Different lens systems will have different optic characteristics, and light refraction will be different than depicted in FIG. 7. Also, if different dimensions are chosen for the screen size, or if the screen shape changes, or if the projector and lens are moved closer or farther from the screen, or other conditions change, then the amount of picture offset will be different than occurs in the preferred embodiment. The total picture offset can be recalculated for the new conditions, and experimentation with the relative positions of the structures will permit a designer to optimize the picture offset for the chosen conditions. If the projector is placed below or to the side of the audience, then the lens is moved up or to the side to compensate for the displacement of the projector from the centerline of the audience's view.

An example of a mathematical representation of film position relative to lens position for the lens depicted in FIG. 7 is as follows. If quantity "y" is the film width or height, "K" is a constant, and quantity "a" is the exit angle of a ray from the lens, then $$a = y/(0.016K)$$

This shows that linear film size is approximately proportional to the exit angle of the lens. For example, an image measuring 2.74 inches in diameter on film will fill a 180° projection angle. The technique of offsetting a lens is known in the art, and is sometimes done in traditional, flat screen theaters. However, it has never before been accomplished for the projection of an image onto a curved screen that is in large part positioned below an audience.

It should be noted that in the preferred embodiment the curved projection screen 12 is a portion of a hemispherically shaped dome. However, the shape may be another type of curve, such as an approximate spherical shape, parabola or otherwise.

Figure 8:
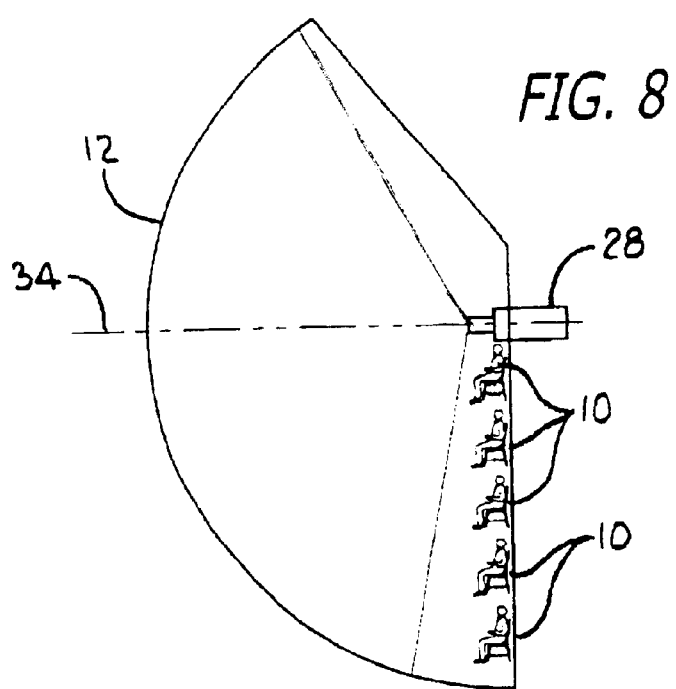
FIG. 8 is a side view of an alternative embodiment depicting the relative positions of the projection surface, projector and viewers.
Figure 9:
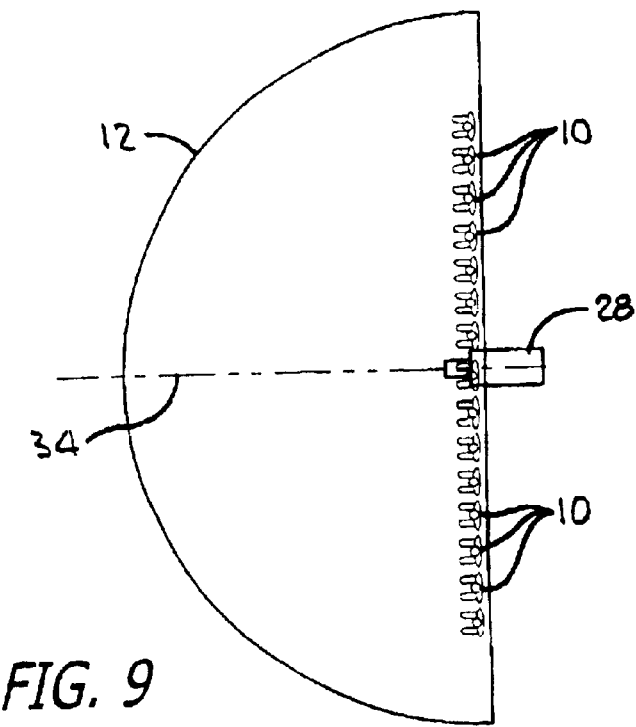
FIG. 9 is a top view of the alternative embodiment of FIG. 8.
Figure 10:
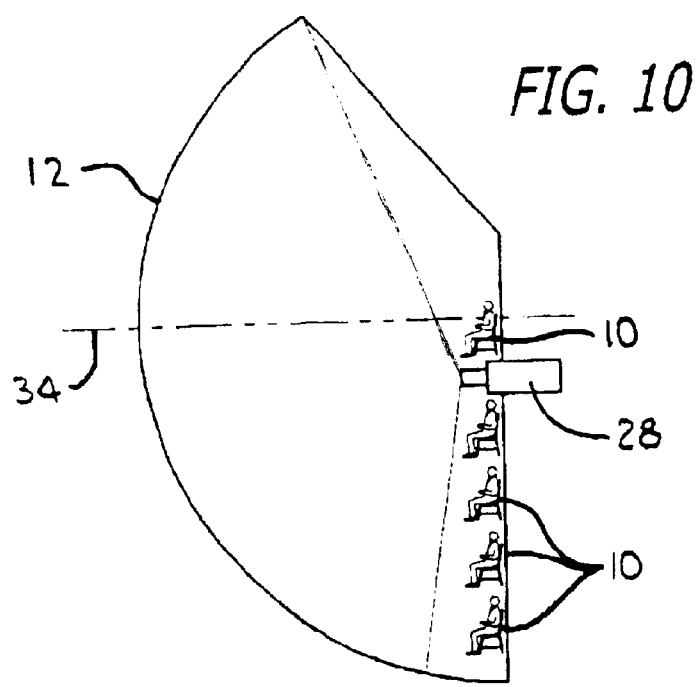
FIG. 10 is a side view of another alternative embodiment depicting the relative positions of the projection surface, projector and viewers.
Figure 11:
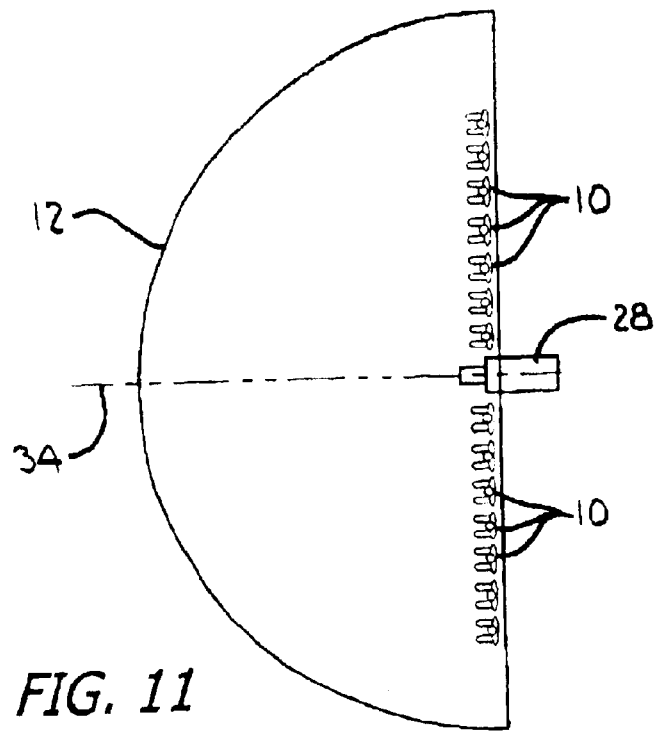
FIG. 11 is a top view of the alternative embodiment of FIG. 10.

In a theater of this invention, the projector is optimally located above the horizontal centerline 34 of the screen 12, and above the top most row of viewers 10. In this preferred embodiment, the projector and viewer positions were chosen to maximize viewing capacity. Depending on the type of show being projected, for example, a balloon ride, space ship flight, etc. different locations for the projector and viewers may be desirable. FIGS. 8 and 9 are elevation and plan views respectively of a projector 28 positioned on the centerline 34 of the screen 12, with viewers 10 located below and on either side of projector 28. FIGS. 10 and 11 are elevation and plan views respectively of a projector 28 positioned below the centerline 34 of screen 12. Viewers 10 are located below and above, and on either side of the projector 26. In other embodiments, a projection booth may be located a distance away from the audience and a projector head having the lens system 32 may be traversed into position via a tunnel. A hydraulic lift may be used to raise the projector head into the theater from the floor area. Various designs may be chosen to minimize encroachment of the projector 28, the lens system 32 and the film transport equipment into the available viewing area. When placed in other locations, such as below the centerline 34, the optics are adjusted to compensate and take into account the relative positions of the screen, audience and projector.

The matching of the positions of the projector, the lens system, the screen and the audience are important for achieving the various goals of the invention. One of the goals is to provide a recording and projection system that does not require sophisticated post production image manipulation, such as software based computer graphics image manipulation, to compensate for distortions created first by recording, and then by projection. The optical characteristics of the filming and projections systems must be noted and tuned to operate together without the need for significant alteration.

In the preferred embodiment, the lenses of the camera 80 and projector are matched so that the field of view of the projected image substantially matches the field of view of the recorded image 82, to the extent the projected image is visible on the curved screen. The camera 80 recording the images is maintained in a horizontal position with the camera 80 and camera lens 84 longitudinal axes 86 and transverse axes 88 maintained in a substantially horizontal orientation, and the projector 28 is likewise maintained horizontal. The image is projected onto screen 12 so that the sweet spot of the audience of viewers 10 is located at the position of camera 80 relative to the scene 90 which was recorded. When projected, the combination of the offset of the projector lens and the dimensions and placement of the screen relative to the audience of viewers 10 causes the horizon to appear to the viewer in approximately the same place and at approximately the same angle of view (viewing angle) as the original scene 90 appeared to the front 92 of the lens 84 of the recording camera 80 (scene angle). In the present invention, realism is achieved when the viewer sees on the screen approximately what the camera 80 lens 84 saw during recording, with the horizon and angles of view being essentially the same. As an example, an acceptable projector 28 would be an IMAX brand 15–70 mm 48 fps projector. Compatible cameras are also available from IMAX Corp. Another example of a camera which could be used is a Wilcam camera built by Geoff Williamson.

The projection lens 32 is a special variety of a fisheye type lens with a field flattener for use with the 15–70 mm format. Imax and Iwerks have new excellent lenses for this use. Lenses for this application are a special design. In the preferred embodiment, the image is filmed with a Zeiss 30 mm Distagon lens. The distortion curve of this lens is matched closely so that a series of equal angular steps in the filming environment are reproduced by equal angular steps in the theater. An angular magnification of 1.207 is assumed, in which case the following reference points are preferably matched.

The reference values (or curves) should preferably be matched to within +1.0% over the central 60° of view. From 60° to 90° variations of up to +2.0% are permissible in the preferred embodiment. These values may be altered providing the image quality is not adversely affected for the eventual viewer. Variations must be gradual so that screen images are not seen to suddenly increase or decrease in size. In the preferred embodiment, the maximum rate of change may be 0.5% per 5°.

The filming system is optimized with the projection system so that post-production image manipulation is reduced to a minimum. The invention involves not only the projection system, but a compatible recording system as well. Just as tilting the projector causes straight lines to appear curved, filming with a tilted camera also causes distortion. As stated above, a goal is to duplicate what the camera 80 lens 84 saw. However, unless the camera is in a proper orientation, the image recorded will not be realistic and the projected image will not convey to a theater viewer the feeling of immersion in a real scene. For example, if the scene is recorded with the camera lens tilted downward, below horizontal, distortion is introduced which will detract from the feeling of immersion in the theater viewer's mind. It will create the impression of tilted horses as discussed above. It is necessary to record a horizon line in a position so that it can be then projected as a straight line at approximately the viewer's eye level, in the case of a horizon at a distance, because that is where an observer in the real world would perceive the horizon to be. If the camera were to shoot the horizon hither or lower than that, the theater viewer would perceive a false perspective. In other words, the procedure is to shoot the film 94 and project it so that the distant horizon line lies approximately in the center of the audience. All the recorded objects then appear to be horizontal and objects with parallel sides in the real world appear to have the same parallel sides when the image is projected into the dome. Of course, when a camera lens/observer is moving toward a large object, such as a mountain, the top of the mountain will appear above the eye level of the camera lens/observer. This relative position of the mountaintop as viewed by the camera lens/observer must be maintained in the projected image as viewed by the theater viewer. As is known to persons ordinarily skilled in the art, all physical scenes include a horizon which, when viewed at a distance, is observed to be at approximately eye level. Sometimes the horizon may be obscured by an object such as a mountain.

In the preferred embodiment, for the camera 80 that records the film 94, a standard IMAX lens was chosen. However, other lenses could be used, such as manufactured by Iwerks. Nikon or others. For the projector lens, an IMAX lens was also chosen, but options are available from Iwerks, Nikon and others. The projector chosen was an IMAX high-speed projector operating at 48 frames per second, but others could be used, such as available from Iwerks, and

| Camera Half Angle | 20.00° | 30.00° | 45.00° | 50.00° | 56.10° | 70.05° | 74.18° |
|---|---|---|---|---|---|---|---|
| Film Position in mm (y) | 10.58 | 15.71 | 22.97 | 25.25 | 27.91 | 33.38 | 34.80 |
| Projection Half Angle (θ) | 24.14° | 36.21° | 54.32° | 60.35° | 67.71° | 84.55° | 89.54° |

Two polynomials which describe these points are (y in mm, θ in degrees)

$$y = 44.21(0.01\theta) - 6.345(0.01\theta)^3 - 0.394(0.01\theta)^5$$

$$\theta = (2.260)y + (184E-6)y^3 + (4940E-14)y^7$$

could operate at other frame rates. However, the speed of 48 frames per second was chosen because of the picture quality produced. The preferred film is 15 perforation, 70 mm film.

Figure 12:
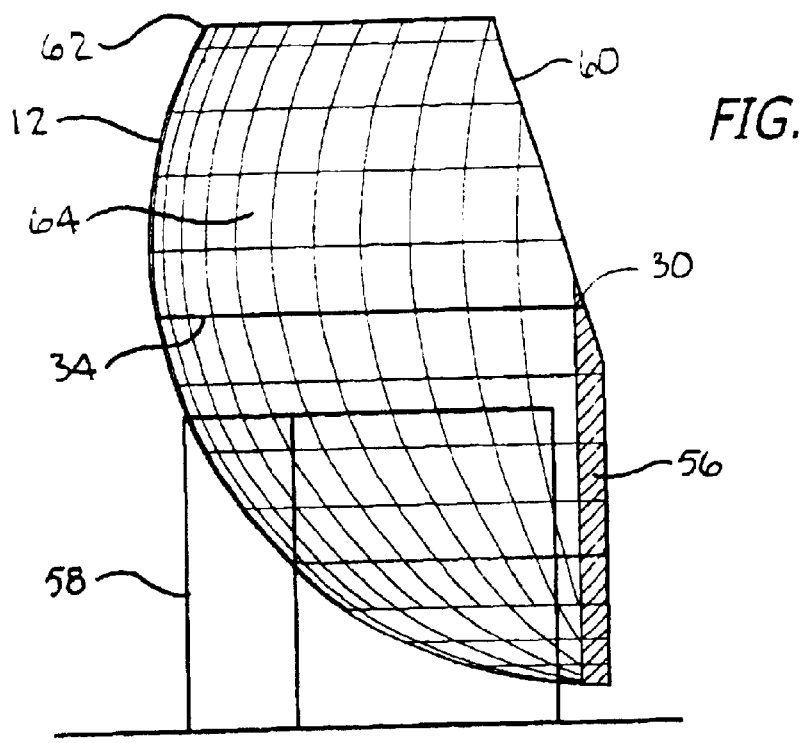
FIG. 12 is a side view of a dome shaped projection surface.
Figure 13:
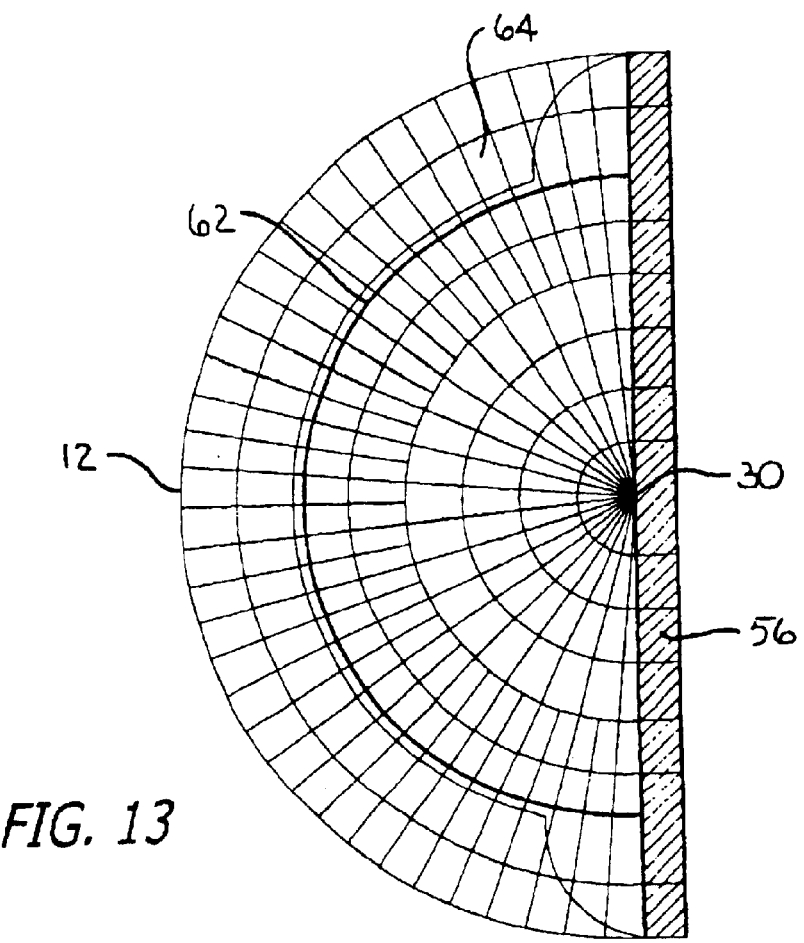
FIG. 13 is a top view of a dome shaped projection surface.

The projection screen 12, which was chosen for the preferred embodiment of this invention, has unique characteristics. FIG. 12 depicts a side elevation view of screen 12. FIGS. 13 and 14 are plan and rear elevation views respectively. In the preferred embodiment, the screen 12 is essentially a segment of a sphere which has a radius of approximately 480 inches. It may have an optional cylindrical section 56 to hide structural ride elements from the viewers 10. The screen 12 is supported by a support structure 58, which may be any structure capable of supporting the size, shape and weight of the selected screen. FIG. 12 shows an optional cutout 60, which may be any configuration in order to provide clearance for other ride components or structure. The top edge 62 of screen 12 is shown.

Domed screens, or screens that are segments of spheres, are usually made of overlapping metal perforated tiles or panels 64. Not every panel 64 is labeled in the figures. The dimensions of the panels may vary, depending on the size and curvature of the screen 12. The panels have perforations 66 to reduce weight. Panels are typically made of metal such as aluminum, which may be coated with a reflective surface. The panels 64 are overlapped and fastened together on ribs 68 to form the entire surface of the screen 12. Fasteners 70 are used to attach the panels 56 to ribs 68. The perforations 66 reduce the reflectivity of the panel surfaces, because reflective material is removed from the panels. When the panels are overlapped at the attachment points at ribs 68, some portion of the perforations 66 will lay over the reflective surface portions of the underlying panel, thereby increasing reflectivity in that area. In order to eliminate this increase in reflectivity, which would cause bright spots on the screen 12, low reflective material 72, such as black tape, is positioned between the overlapping portions of panels 64. Domed projection screens made in accordance with the foregoing principles are commercially available, for example from the Spitz Company.

Figure 16:
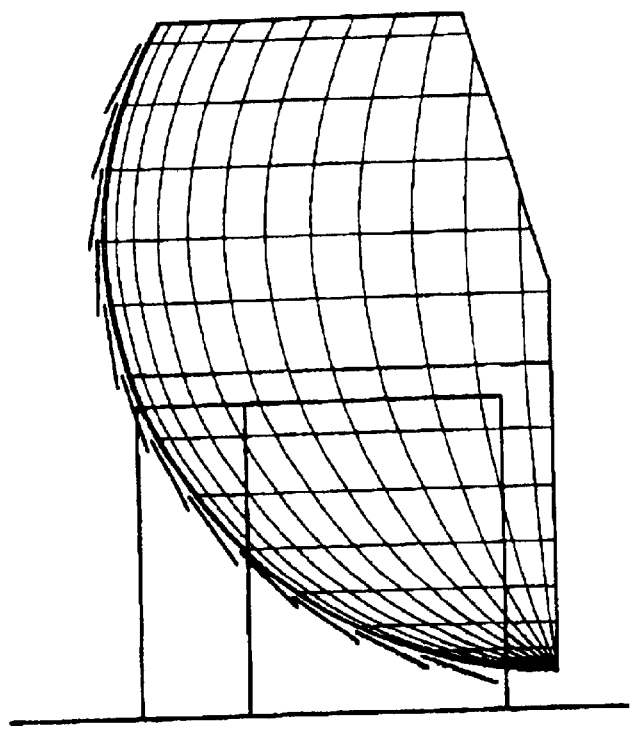
FIG. 16 is a side view of a dome shaped projection surface depicting the overlapping of projection surface panels.

However, the direction of the overlaps preferably should be changed from the standard configuration. In the preferred embodiment, the panels 64 are overlapped, or seamed, beginning at the top of the dome and working down, so that the top edge of a lower panel lies on top of the panel immediately above it. This is depicted in FIG. 16. In the projection system of the present invention, where the audience is viewing the scene primarily downwardly, this method of overlapping panels reduces illumination of the visible edges, which would otherwise appear as lines across the screen. In the projection systems of the past, which did not attempt to immerse the viewer into the scene as is one of the objects of the present invention, illumination of panel edges was not as critical a factor as in the present invention. While the standard construction technique of overlapping in the direction opposite from that shown in FIG. 16 may work in the present invention, it detracts from the feeling of the viewer being immersed in the projected scene. This problem becomes especially noticeable in bright scenes. Additionally, in the preferred embodiment, the edges are chamfered to reduce the edge effect.

Figure 17:
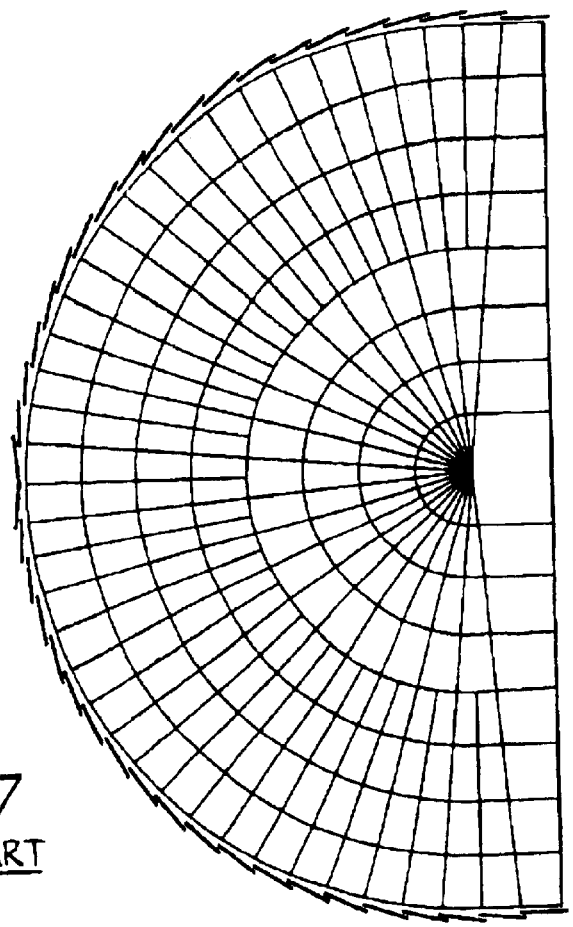
FIG. 17 is a top view of a prior art dome shaped projection surface depicting the overlapping of projection surface panels.

Additionally, in the preferred embodiment, the direction of the overlap changes depending on whether the audience is looking down or up at that part of the screen. Also, the panels can be overlapped from side to side to minimize the edge effect, which can also create vertical lines across the screen, especially at the outside portions of the domed screen. FIG. 17 depicts a panel lapping pattern of a prior art dome.

In the preferred embodiment, the dome is constructed of a heavier gauge material at the bottom of the dome than at the top in order to protect the dome from objects that might be dropped onto the surface, for example, by a member of the audience seated over the bottom of the dome. In the preferred embodiment, the panels 64 are approximately 0.040 inches thick throughout most of the screen 12, but are 0.060 inches thick at the bottom of screen 12.

It is possible to extend the screen underneath the feet of the audience and behind them. That causes additional optical problems because, as configured in the preferred embodiment, the image from the lens at its lowest point projects vertically downward.

The apparatus and techniques described above may be adapted for 3D recording and projection, using known principles in the art. Two cameras and two projectors may be used to record and then project two images, one to be viewed essentially by the left eye and the other to be viewed essentially by the right eye of a viewer to achieve a stereoscopic effect and the perception of a third dimension. The principles of the invention would be applied to each camera and projector. For large format films as are used in the preferred embodiment of the invention, an IMAX 3D camera may be used. This camera is one unit with two film paths and two lenses mounted a set distance apart. The same applies to the projectors. The 3D version consists of two film paths mounted one above the other with a twin lens package.

Reference has been made throughout this description to a domed projection surface. This should not be construed as limiting the geometry of the projection surface to a hemispheric shape. The surface may be curved according to other geometries, such as a section of an ellipse, or other curve. The lens optics of the projector and/or the camera lens would be matched to project a correct image on the curved surface. The present invention can be adapted to flat screens, as well.

The present invention has been set forth with regard to several preferred embodiments. However, the full scope of the present invention should not be limited by the embodiments described, but rather is defined by the claims which follow.

I claim:

1. A projection system for projecting an image on a curved screen comprising:
   an image projector;
   the image includes a horizon;
   the projector having a centerline of projection;
   a lens on the projector;
   the lens having an axial centerline parallel to the centerline of projection;
   an audience viewing station for one or more viewers of the projected image;
   the audience viewing station having a viewing location;
   the projector is located at a position above the viewing location; the centerline of projection and the axial centerline of the lens are substantially horizontal;
   the axial centerline of the lens is positioned away from the centerline of projection sufficient to place the horizon on the curved screen at approximately the eye level of a viewer positioned at the viewing location; and
   a greater portion of the curved screen extending below the eye of the viewer than above.

2. The projection system of claim 1 wherein the centerline of projection and the axial centerline of the lens are vertically aligned.

3. The projection system of claim 1 wherein the viewing location has a center area.

4. The projection system of claim 3 wherein a viewer is positioned at the center area.

5. The projection system of claim 3 wherein the projector is located at a position away from the center area.

6. The projection system of claim 1 further comprising:

the curved surface having an uppermost portion when the curved surface is oriented in a position for viewing a projection thereon;

at least two panels forming a portion of the curved surface, each panel having a top edge and bottom edge, the top edge of each panel being nearer to the uppermost portion of the curved surface than the bottom edge of the same panel;

each of the at least two panels having an interior surface facing a viewer at the viewer location;

the interior surface of each of the at least two panels having a reflective portion;

the upper edge of one of the at least two panels being positioned to overlap at least a portion of the bottom edge and at least a portion of the interior surface of another one of the at least two panels, defining an overlapping portion.

7. The projection system of claim 1 wherein the horizon on the curved surface is substantially horizontal.

8. The projection system of claim 1 wherein in plan view the projector lens front is located forward of the viewing location.

9. The projection system of claim 1 wherein the projector ions front is forward of the audience viewing station.

10. The projection system of claim 1 wherein the projector lens projects the image approximately 38 degrees above the horizontal centerline of the curved screen and down to generally 90 degrees below the horizontal centerline of the curved screen.

11. The projection system of claim 1 wherein the curved screen extends down at least 60 degrees below the eye of the viewer.

12. A method for creating in the mind of a viewer a realistic sense of flying over a physical scene having a horizon comprising:

recording the physical scene on film using a camera and lens;

during recording maintaining the longitudinal and transverse axes of the camera and lens substantially horizontal;

during recording maintaining the horizon approximately horizontal and at an approximately consistent position on the film in a vertical direction;

displaying the recorded scene on the interior of a curved surface using a projector and lens;

the projector being positioned relative to a viewer location which is positioned relative to the curved surface, with the longitudinal and transverse axes of the projector being substantially horizontal;

the projector lens axis being positioned relative to the film in the projector a distance sufficient to position the projected horizon at approximately the eye level of a viewer at the viewer location, while maintaining the longitudinal axis of the lens substantially horizontal; and the lenses of the camera and projector being matched so that the field of view of the projected image substantially matches the field of view of the recorded image, to the extent the projected image is visible on the curved surface.

13. The method of claim 12 further comprising:

the curved surface having an uppermost portion when the curved surface is oriented in a position for viewing a projection thereon;

providing at least two panels forming a portion of the curved surface, each panel having a top edge and bottom edge, the top edge of each panel being nearer to the uppermost portion of the curved surface than the bottom edge of the same panel;

each of the at least two panels having an interior surface facing a viewer at the viewer location;

the interior surface of each of the at least two panels having a reflective portion;

the upper edge of one of the at least two panels being positioned to overlap at least a portion of the bottom edge and at least a portion of the interior surface of another one of the at least two panels, defining an overlapping portion.

14. The method of claim 13 further wherein the panel includes at least one aperture.

15. The method of claim 14 further comprising placing an element between the panels at the overlapping portion, the element having a lower reflectivity than the reflective portion of a panel.

16. The method of claim 13 wherein the panel includes a plurality of apertures.

17. The method of claim 16 further comprising placing an element between the panels at the overlapping portion, the element having a lower reflectivity than the reflective portion of a panel.

18. A method for recording an image and projecting the recorded image onto a surface having a curvature, the projected image to be viewed from a viewpoint located in space comprising:

recording the image on film using a camera and lens, the lens having a front surface closest to the image, the image being located at horizontal and vertical scene angles measured from the center of the front surface of the lens;

during recording maintaining the longitudinal and transverse axes of the camera and lens substantially horizontal;

projecting the recorded image onto the curved surface using a projector and lens;

the projector being positioned relative to the curved surface, with the longitudinal and transverse axes of the projector being substantially horizontal;

projecting the image on the curved surface, the projected image being at horizontal and vertical viewing angles as measured from the viewpoint; and the horizontal and vertical scene angles and the horizontal and vertical viewing angles being substantially matched.

19. The method of claim 18 wherein the curved surface has a side with a positive radius of curvature, the side with a positive radius of curvature positioned toward the projector.

20. A method for creating in the mind of a viewer a realistic sense of flying over a physical scene comprising:

displaying a recorded scene on the interior of a curved surface using a projector and lens for viewing at a viewing station;

the projector being positioned relative to the viewing station, with the longitudinal and transverse axes of the projector being substantially horizontal, the projector lens axis being positioned relative to the film in the projector so as to position the projected horizon at approximately the eye level of a viewer at the viewing station, while maintaining the longitudinal axis of the lens substantially horizontal; and the lenses of the camera and projector being matched so that the field of view of the projected image substantially matches the field of view of the recorded image, to the extent the projected image is visible on the curved surface.

21. The method of claim 20 wherein the recorded scene was recorded on film using a camera and lens, during recording the longitudinal and transverse axes of the camera and lens were maintained substantially horizontal, and during recording the horizon was maintained approximately horizontal and at an approximately consistent position on the film in a vertical direction.

22. A method for projecting a recorded image of a scene onto a surface having a curvature, the projected image to be viewed from a viewpoint located in spare, the scene having been recorded on film using a camera and lens, the lens having a front surface closest to the scene, the scene being located at horizontal and vertical scene angles measured from the center of the front surface of the lens comprising:

projecting the recorded image onto the interior of a curved surface using a projector and lens;

the curved surface being positioned so its curvature is toward the projector;

the projector being positioned relative to the curved surface, with the longitudinal and transverse axes of the projector being substantially horizontal;

the projected image being at horizontal and vertical viewing angles as measured from the viewpoint; and the horizontal and vertical scene angles and the horizontal and vertical viewing angles being substantially matched.

23. A method for creating in the mind of a viewer a realistic sense of flying over a physical scene having a horizon comprising:

displaying the physical scene which had been recorded on film using a camera and camera lens, the longitudinal and transverse axes of the camera and camera lens being maintained substantially horizontal and the horizon being maintained approximately horizontal and at an approximately consistent position on the film in a vertical direction during recording;

displaying the recorded scene on the interior of a curved surface using a projector and projector lens;

the projector being positioned relative to the viewer who is positioned relative to the curved surface, with the longitudinal and transverse axes of the projector being substantially horizontal;

the projector lens axis being positioned relative to the centerline of the film in the projector a distance sufficient to position the projected horizon at approximately the eye level of the viewer, while maintaining the longitudinal axis of the lens substantially horizontal; and the camera lens and projector lens being matched so that the field of view of the projected image substantially matches the field of view of the physical scene which had been recorded, to the extent the projected image is visible on the curved surface.

24. A method for creating in the mind of a viewer a realistic sense of flying over a physical scene having a horizon, the scene having been recorded on a medium utilizing a recording lens, the medium having a horizontal centerline, during recording the longitudinal axis of the recording lens had been maintained substantially horizontal, during recording the horizontal centerline of the medium had been maintained substantially horizontal, comprising:

displaying the recorded scene on the interior of a curved surface using a projection lens;

the projection lens being positioned above the viewer;

the longitudinal axis of the projection lens being substantially horizontal;

the longitudinal axis of the projection lens being positioned downward relative to the horizontal centerline of the medium a distance sufficient to position the projected horizon at approximately the eye level of the viewer; and the recording lens and projection lens being matched so that the field of view of the projected scene substantially matches the field of view of the physical scene which had been recorded, to the extent the projected scene is visible on the curved surface.

25. A method for projecting a recorded image onto a surface having a curvature, the projected image to be viewed from a viewpoint comprising:

displaying an image that had been recorded on film using a camera and lens, the lens having a front surface closest to the image, the image being located at horizontal and vertical scene angles measured from the center of the front surface of the lens, the longitudinal axis of the lens being maintained substantially horizontal during recording;

projecting the recorded image onto the curved surface using a projector and lens;

the lens being positioned relative to the curved surface, with the longitudinal axes of the lens being substantially horizontal;

projecting the image on the curved surface, the projected image being at horizontal and vertical viewing angles as measured from the viewpoint; and the horizontal and vertical scene angles and the horizontal and vertical viewing angles being substantially matched.

26. A projection system for projecting an image carried on a medium onto a curved screen, the image having a horizontal centerline and a horizon, comprising:

an image projector;

a lens on the projector, the lens having an axial centerline which is positioned horizontally;

a viewer;

the projector is located above the viewer;

the axial centerline of the lens is positioned below the horizontal centerline of the image sufficient to place the horizon on the curved screen at approximately the eye level of the viewer; and a greater portion of the curved screen extending below the eye of the viewer than above.

27. The projection system of claim 26 wherein the curved screen extends down at least 60 degrees below the eye of the viewer.

28. The projection system of claim 26 wherein the curved screen extends down at least 75 degrees below the eye of the viewer.

29. A projection system for projecting an image carried on a medium onto a curved screen, the image having a horizontal centerline and a horizon, comprising:

a viewer;

an image projector located above the viewer, the projector having a lens, the lens having an axial centerline which is positioned horizontally and below the horizontal centerline of the image sufficient to place the horizon on the curved screen at approximately the eye level of the viewer; and a curved screen extending substantially below the viewer, wherein a greater portion of the curved screen extends below the eye of the viewer than above.

* * * * *

UNITED STATES PATENT AND TRADEMARK OFFICE
CERTIFICATE OF CORRECTION

PATENT NO. : 6,727,971 B2
DATED : April 27, 2004
INVENTOR(S) : Lucas

It is certified that error appears in the above-identified patent and that said Letters Patent is hereby corrected as shown below:

Column 3,
Line 39, please move the words "INVENTION SUMMARY" to line 40 and center the text.

Column 5,
Line 41, please delete the word "carved" after the word "the" to read -- curved --.

Column 6,
Line 13, please delete the apostrophe after the number "46" located after the word "position".

Column 8,
Line 30, please delete the word "hither" after the word "horizon" and replace it with the word -- higher --.

Column 11,
Line 25, please delete the word "ions" at the beginning of the line and replace it with the word -- lens --.

Signed and Sealed this

Fifteenth Day of February, 2005

JON W. DUDAS
*Director of the United States Patent and Trademark Office*